United States Patent [19]

Kushmuk

[11] 4,008,776
[45] Feb. 22, 1977

[54] ELECTRONIC WEIGHING SCALE
[75] Inventor: Walter P. Kushmuk, Niles, Ill.
[73] Assignee: Continental Scale Corporation, Bridgeview, Ill.
[22] Filed: Sept. 4, 1975
[21] Appl. No.: 610,143
[52] U.S. Cl. .......................... 177/210 R; 177/241; 200/51 R
[51] Int. Cl.² .................. G01G 3/14; G01G 21/28; H01R 13/70
[58] Field of Search ..... 177/210, 245, 241, DIG. 3; 200/51.04, 51.05

[56] References Cited
UNITED STATES PATENTS

| | | | |
|---|---|---|---|
| 2,718,636 | 9/1955 | Harrington et al. | 200/51.5 X |
| 3,667,561 | 6/1972 | Hutchinson et al. | 177/245 |
| 3,921,736 | 11/1975 | Rogers | 177/DIG. 3 |

Primary Examiner—George H. Miller, Jr.
Attorney, Agent, or Firm—Johnston, Keil, Thompson & Shurtleff

[57] ABSTRACT

A weighing scale especially adapted for use as a pediatric or infant scale having a mechanical leverage weighing structure with a high degree of sensitivity and low friction and hysteresis coupled with a compatible electronic measuring system and a digital read-out system is provided wherein a base has a weight responsive movable platform mounted thereon, a housing mounted on the base behind the platform, said housing forming an enclosure extending upwardly substantially higher than the platform with weighing mechanism inside the housing connected through an opening in the base to the platform, the weighing mechanism including a variable inductance transducer which generates a signal in response to weight on the platform and a read-out unit mounted on the top of the housing, said read-out unit displaying weight measurements and being operable in response to said signal.

4 Claims, 6 Drawing Figures

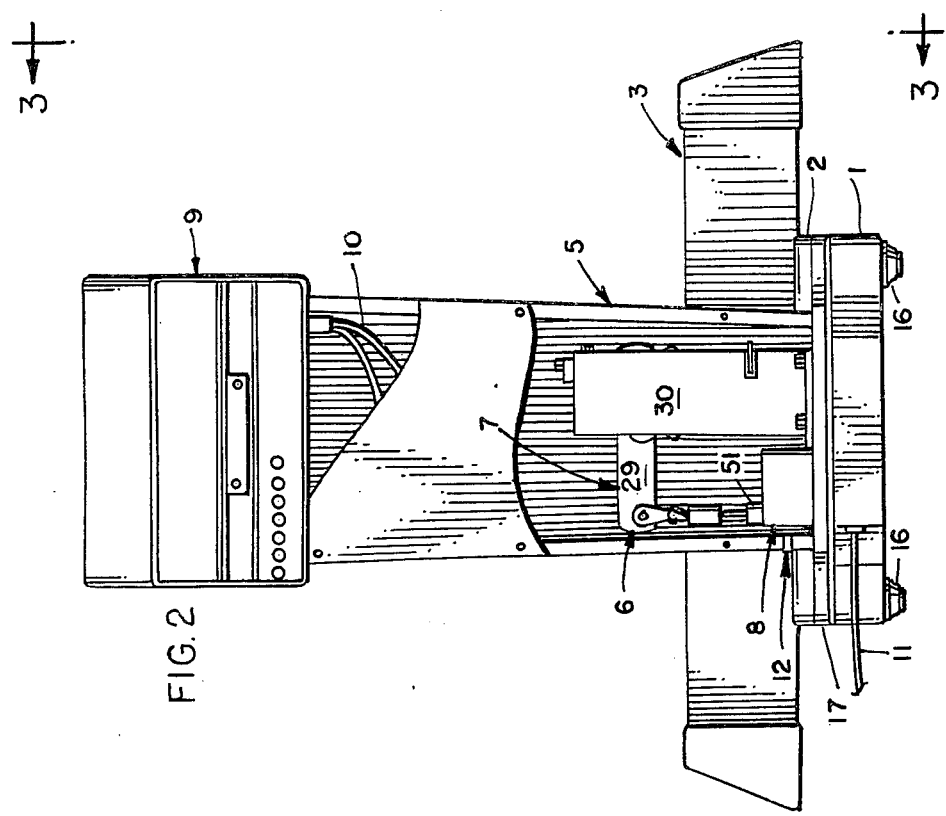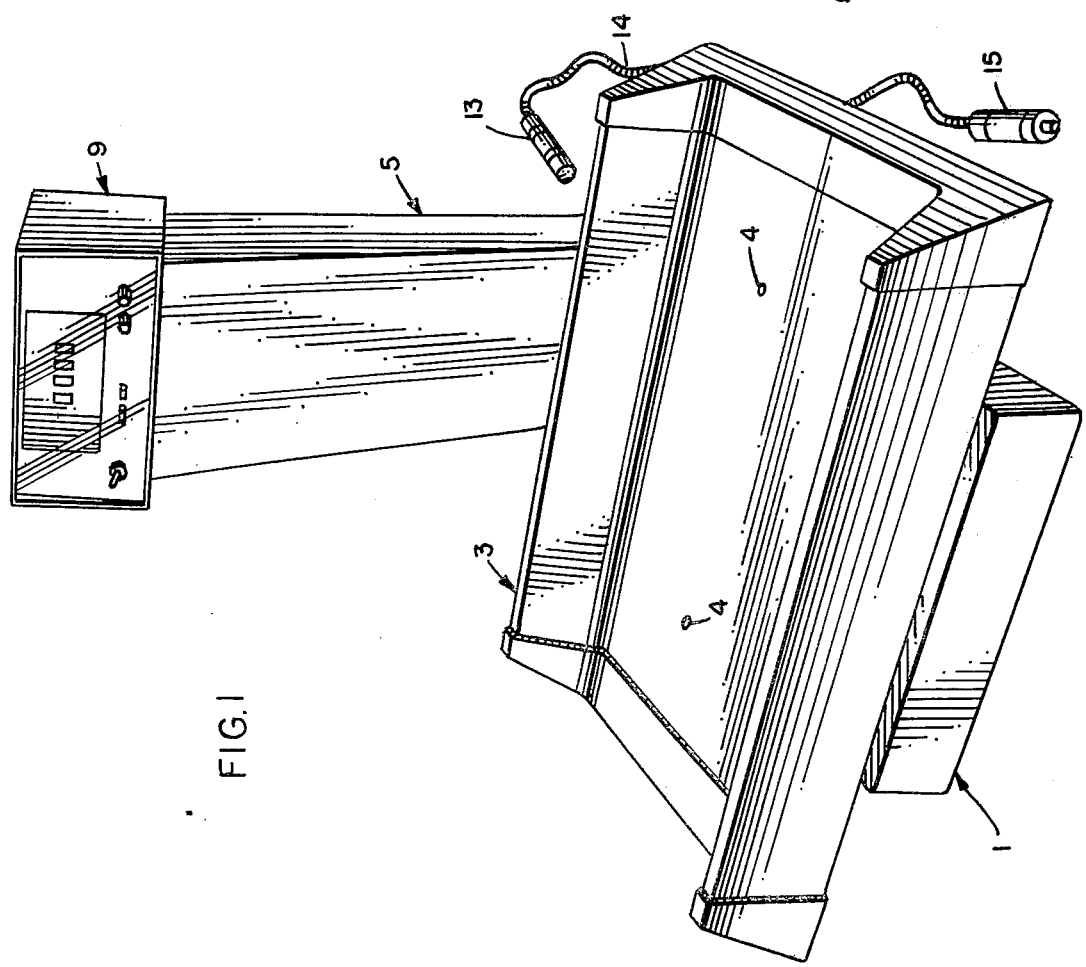

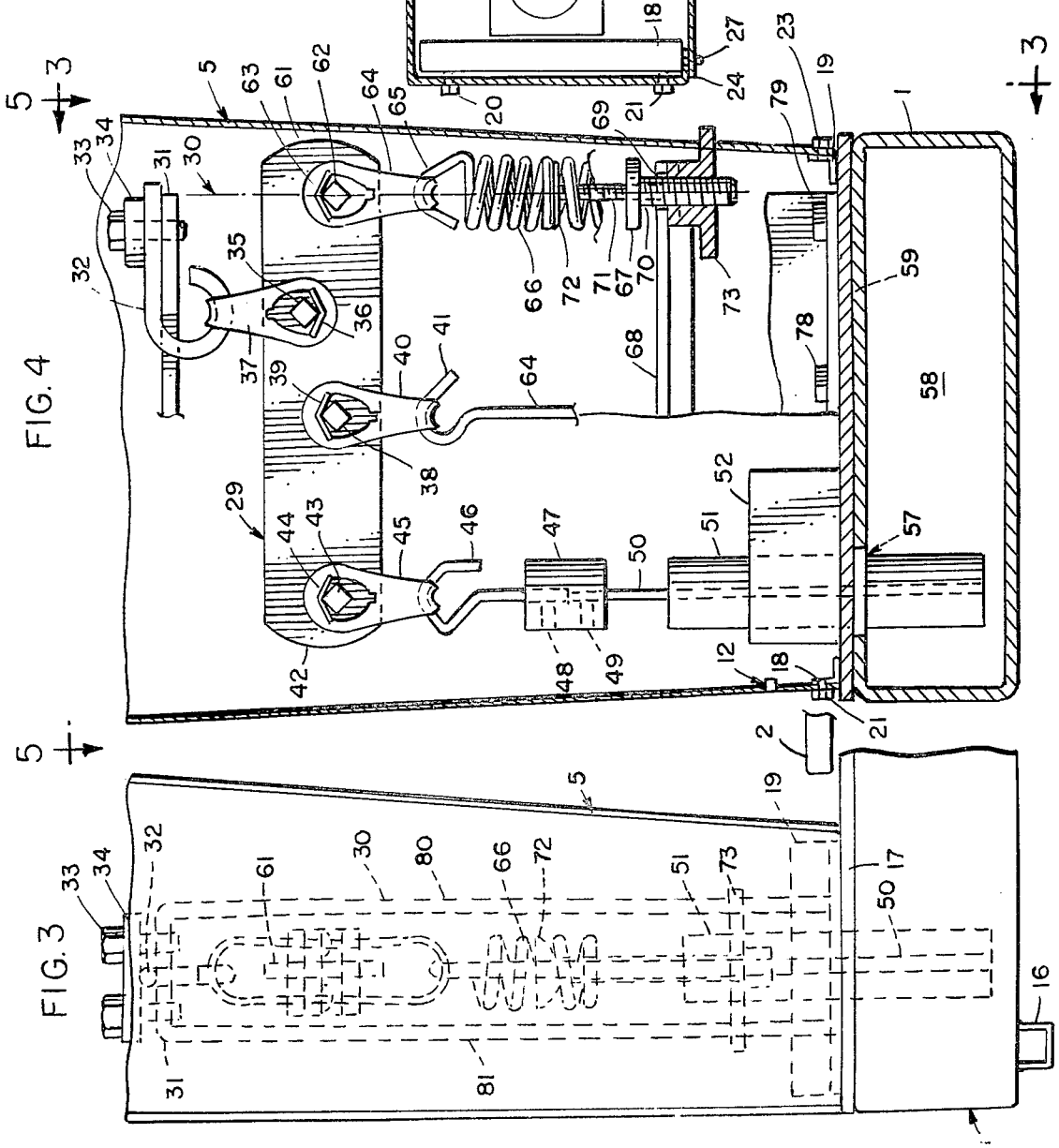

ELECTRONIC WEIGHING SCALE

BACKGROUND

U.S. Pat. No. 3,667,561, 3,724,574 and 3,808,694 disclose weighing devices and height measuring devices in which units of measurement are transmitted to a digital read-out system. These devices are primarily intended to measure weight and height of persons capable of standing on the platform of a scale.

It would be desirable to provide a highly accurate mechanical weighing system which is compact and is especially adapted for use as a pediatric or infant weighing scale.

OBJECTS

One of the objects of this invention is to provide a new and improved device for measuring weight which is compact and has a digital read-out system directly associated with a mechanical leverage weighing system having a high degree of sensitivity and low friction and hysteresis coupled with a compatible electronic system.

Another object of the invention is to provide a new and improved structure in which the mechanical leverage elements and the electronic system including the digital read-out unit are compatibly associated.

Still another object of the invention is to provide a weighing scale of the type described in which the mechanical leverage weighing system and a compatible electronic measuring system are mounted independently within a housing on which a read-out unit is also mounted.

Another object of the invention is to provide a new and improved compact weight measuring apparatus especially adapted for pediatric use in doctors' offices, medical centers and hospitals and wherein weight measurements can be recorded instantly and read visually at the time they are recorded, or, if desired, can also be fed to a computer.

Other objects and advantages of the invention will appear from the following description in conjunction with the accompanying drawings.

THE DRAWINGS

In the drawings:

FIG. 1 is a perspective front view illustrating one embodiment of the invention;

FIG. 2 is a back elevational view with parts broken away of the embodiment shown in FIG. 1;

FIG. 3 is a side view with parts broken away of the embodiment shown in FIGS. 1 and 2;

FIG. 4 is a view, partly in section, with parts broken away, taken along the line 3,3 of FIG. 2;

FIG. 5 is a view, partly in section, taken along the line 5,5 of FIG. 4; and

BRIEF SUMMARY OF THE INVENTION

Figure 6:
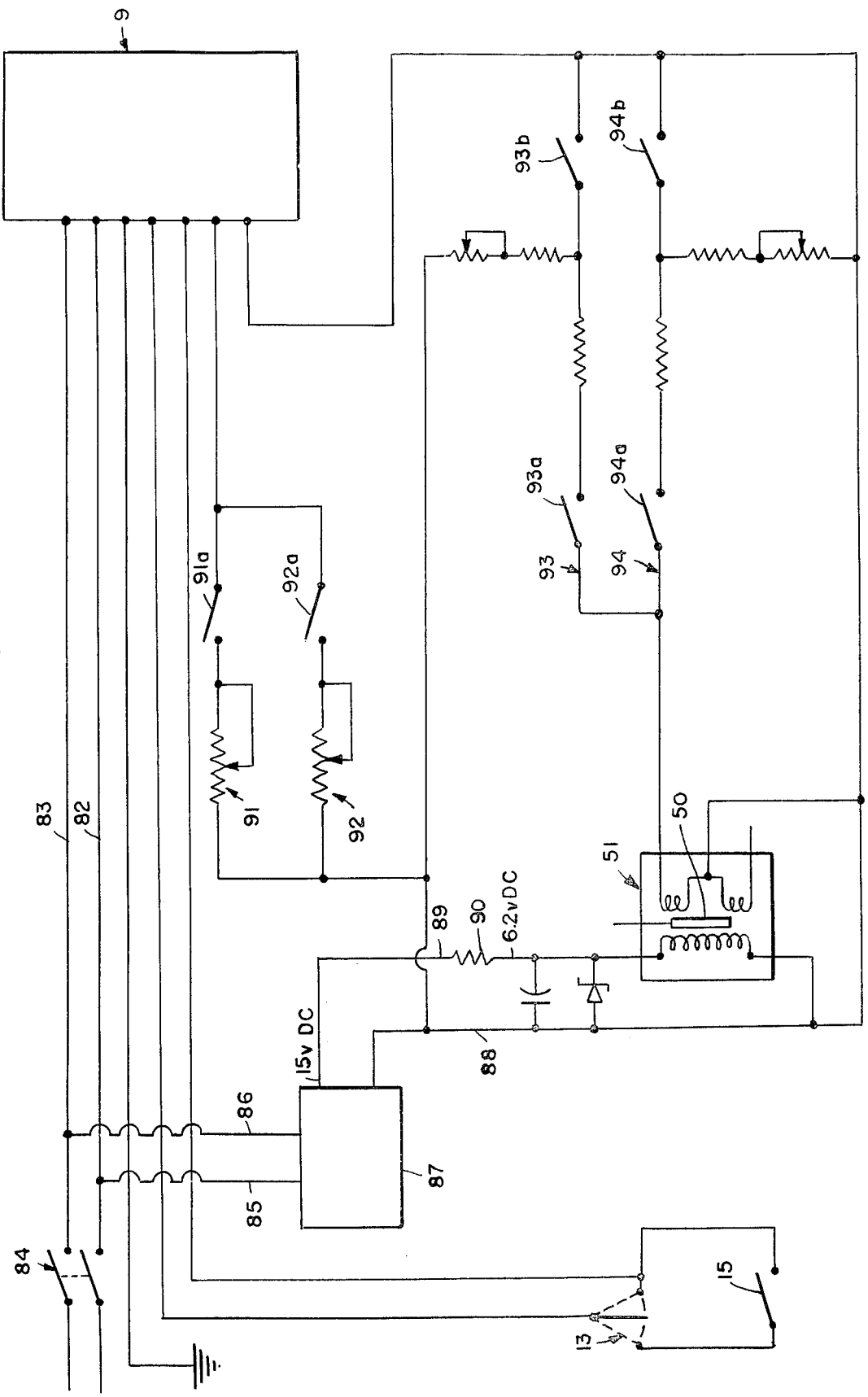
FIG. 6 is a schematic wiring diagram.

In accordance with the invention a weighing scale is provided comprising in combination a base, a weight responsive movable platform mounted on said base, a housing mounted on said base behind said platform, said housing forming an enclosure extending upwardly substantially higher than said platform, weighing mechanism in said housing connected through an opening in said base to said platform, said weighing mechanism including a variable inductance transducer which generates a signal in response to weight on said platform, and a read-out unit mounted on the top of said housing, said read-out unit displaying weight measurements and being operable in response to said signal.

As a preferred embodiment of the invention, weighing leverage mechanism in the housing is supported from the base of the weighing scale independently of the housing.

As another preferred embodiment of the invention the read-out unit is connected to a switch which can be opened and closed momentarily for reading and holding a reading of weight wherein the subject being weighed does not always remain still so that the weight can be read instantaneously at a moment when the subject is still.

DETAILED DESCRIPTION OF THE INVENTION

Referring to FIGS. 1 and 2 of the drawings, the apparatus illustrated comprises a base generally illustrated at 1, a weight responsive movable platform generally indicated at 2, a receptacle generally indicated at 3, which is attached to the movable platform 2 by means of screws 4, or in any other suitable manner, a housing generally indicated at 5 mounted on said base 1 behind said platform 2 and forming an enclosure extending upwardly substantially higher than said platform, a weighing mechanism generally indicated at 6, said weighing mechanism including a leverage system generally indicated at 7 and a linear variable differential transformer generally indicated at 8. A read-out unit generally indicated at 9 is mounted on the top of housing 5 and is connected by means of wires 10 to transformer 8 and to a source of electricity through wires 11. A jack is provided in a opening 12 for connection to a connector 13, electrical conductor 14 and a push button switch 15. The switch 15 can be of the momentary type or of the usual off-on type.

Referring to FIGS. 2 to 5, the base 1 is provided with feet 16 which serve as supports for the base and contains a welded or otherwise secured top plate 17 to which the housing 5 is secured by means of angle brackets 18 and 19. The angle brackets 18 and 19 are secured to top plate 17 of base 1 by welding, or in any other suitable manner, and the housing 5 is secured to the angle brackets 18 and 19 by screws 20, 21, 22 and 23, or in any other suitable manner. Housing 5 is preferably made of a metal which is bent in a U-shaped formed with flanges 24 and 25 at the rear thereof. A backing member 26 of housing 5 is secured to flanges 24 ad 25 by screws 27 and 28 or in any other suitable manner. Backing member 26 is readily removable by removing screws 27 and 28. The housing of read-out unit 9 is secured to housing 5 in any suitable manner, for example, by welding or by machine screws.

The weighing system comprises a beam 29 extending in a generally horizontal direction within housing 5 and is supported independently of the housing by a supporting structure generally indicated at 30. Supporting structure 30 comprises a top plate 31 to which a hook member 32 is secured by means of bolts 33 which pass through plate 34 and are threadedly connected to member 31.

Beam 29 has a V-bearing 35 which is associated with a knife edge pivot 36 and supported from hook 32 by beam loop 37.

An intermediate portion of beam 29 is connected by knife edge pivot 38, V-bearing 39 and beam loop 40 to steel yard hook 41 which in turn is connected to platform 2 and its associated mechanism so that hook 41 moves in response to and acts as a transmission means for any weight imparted to the platform 2 and its associated mechanism. The platform 2 and its associated mechanism are conventional. Hence, no detailed description is necessary. For the sake of clarity, platform 2 is not shown in its entirety in FIG. 3 but if shown it would occupy a position approximately corresponding to a line through the top side of the portion of the base which extends outwardly through housing 5. It will be understood that platform 2 is directly beneath and supports receptacle 3.

One end 42 of beam 29 is connected through knife edge pivot 43, V-bearing 44 and beam loop 45 to hook 46. Hook 46 is connected by means of a collar 47 and set screws 48 and 49 to plunger rod 50. Plunger rod 50 at its lower end is the core of linear variable differential transformer 51 which is held in place by holder 52. Holder 52 as shown in FIG. 5 is a bifurcated structure having an opening 53 to receive transformer 51 which is held in place by tightened bolt 54. Holder 52 is secured to top plate 17 of base 1 by bolts 55 and 56. Top plate 17 of base 1 contains an opening 57 to permit the passage of transformer 51 into the open space 58 of base 1. Another opening 59 in base 1 permits the passage of steel yard 60 to the conventional mechanical leverage system supporting platform 2.

End 61 of beam 29 is connected by knife edge pivot 62, V-bearing 63 and beam loop 64 to hook 65 which forms the upper end of main spring 66. The lower end of main spring 66 is secured to member 67 which in turn is threadedly secured to an inverted U-shaped supporting plate 68 at threaded opening 69. Supporting plate 68 is welded or otherwise secured to the inner front and inner rear sides of independent supporting structure 30. Bushing 70 of member 67 is internally threaded to receive threaded adjusting rod 71 which is secured at the upper end to plate 72 and can be moved axially by a knob 73. By turning knob 73, rod 71 and plate 72 move axially. Inasmuch as plate 72 is interposed between the coils of main spring 66, this axial movement either increases or decreases the tension on the spring. Thus, initial calibration of the mechanical system can be achieved by changing the number of effective coils which changes the spring rate accordingly. The knob 73 projects through an opening in the side of housing 5 so that it is readily accessible to the user for the purpose of calibrating the scale.

Internal structure 30 which through hook member 32 supports beam 29 and other elements associated therewith is mounted through bottom flanges 74 and 75 on top plate 17 of base 1 by means of bolts 76, 77, 78 and 79. Structure 30 is usually constructed of metal or other strong and rigid material. Housing 5, on the other hand, inasmuch as it does not act as a support for anything, except read-out unit 9, can be constructed of lighter weight sheet metal or other suitable lighter weight material. As will be seen from FIG. 3, structure 30 is substantially rectangular and consists of vertical sides 80 and 81 and top plate 31 which is welded or otherwise secured to sides 80 and 81.

MODE OF OPERATION

When an object to be weighed is placed in receptacle 3, platform 2 is displaced downwardly causing beam 29 to be pulled downwardly through steel yard hook 41. This causes rod 50 to be lowered. Since rod 50 serves as a core of differential transformer 51, lowering the rod 50 will alter the outout of said transformer a predetemined amount depending upon the distance the rod is lowered. In the embodiment shown, pivots 38 and 62 are equally spaced from pivot 35. In the embodiment shown the structure is so arranged that rod 50 is capable of being raised and lowered a vertical distance of 0.5 inch. Steel yard hook 41 will move through a vertical distance of approximately 0.2 inch. Because of this arrangement it is possible to practice the invention so as to provide a working range with or without passing through the null point of the transformer.

The apparatus is sensitive to a weight of 10 grams. The leverage ratio in the platform is 10:1. The apparatus in the form shown is primarily intended for use in weighing babies and for this purpose the maximum weight limit is usually taken to be 40 pounds. The linear variable transformer 51 can be a standard piece of equipment, for example, a differential transformer with a six volt D.C. input and a 1.8 volt D.C. output. Where it is desired to use the apparatus on an alternating current circuit, the usual rectifiers and voltage reducers can be employed.

Referring to FIG. 6 the read-out unit 9 which comprises a digital volt meter of a conventional type is connected to a source of 115 volt, 50–60 cycle A.C. current through conductors 82 and 83 and an off-on switch 84. The A.C. current is also connected through conductors 85 and 86 to a rectifier unit 87 in which the electrical output is converted to a 15 volt D.C. current which passes through conductors 88 and 89 and resistor 90 so that by the time it reaches transformer 51 the current is approximately 6.2 volts D.C. The output signal from transformer 51 passes through a series of resistors to the digital volt meter in read-out unit 9 and is so controlled by the resistors that the maximum output is 400 millivolts (mv), which would correspond to a full-scale reading of 40 pounds or 10 millivolts per pound. The output voltage in the digital read-out unit can be read on a numerical basis by using a conventional digital unit. In the present case this unit is modified in a conventional manner to read either pounds or kilograms simply by pressing a button on the front of the unit. Means are provided at 91 for electrically setting the pounds zero and at 92 for electrically setting the kilograms zero. The electrical pounds zero setting at 91 is controlled by switch 91a and the electrical kilogram zero setting at 92 is controlled by switch 92a. Switches 91a and 92a are normally mounted on read-out unit 9.

The "pounds" output signal from transformer 51, generally indicated at 93, is controlled by switches 93a and 93b, and the "kilograms" output signal from transformer 51, generally indicated at 94 is controlled by switches 94a and 94b. These switches are also normally read-out on red-out unit 9.

It will be understood that two or more switches may be combined in multi-switch units.

An important feature of the invention is the provision of a momentary switch 15 which controls the reading of the read-out unit so that when a subject, such as a baby, is being weighed it is possible to obtain a reading instantaneously at a time when such subject is still or not moving. The momentary switch 15 is connected to the scale through plug 13 which when inserted into the jack in opening 12 opens a switch between the "read enable" pins on the read-out unit 9 so that remote switch 15 must be depressed to close the "read enable" circuit. The scale automatically goes into a "read and hold" mode when the remote switch plug 13 is inserted into the jack receptacle on the scale and returns to the normal operating mode when it is removed. In the normal mode with plug 13 removed from the receptacle, the circuit between the "read enable" pins is closed enabling the read-out unit to respond to the transducer output directly.

It will be recognized that other types of variable inductance transducers can be used instead of linear variable differential transducers. Also, other modifications can be made in the read-out unit. Thus, as already indicated, the read-out unit can be made so that nothing shows in the window thereof until a button is pushed. The read-out unit can also be made to hold the last reading and it can be connected to a computer. It will be understood, of course, that the invention is not limited to units of any particular voltage.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the forms herein disclosed being preferred embodiments for the purpose of illustrating the invention.

The invention is hereby claimed as follows:

1. A weighing scale comprising in combination a base, a weight responsive movable platform mounted on said base, a housing mounted on said base behind said platform, said housing forming an enclosure extending upwardly substantially higher than said platform, weighing mechanism in said housing connected through an opening in said base to said platform, said weighing mechanism including a variable inductance transducer which generates a signal in response to weight on said platform, and a read-out unit mounted on the top of said housing, said read-out unit displaying weight measurements and being operable in response to said signal, and said weighing mechanism in said housing being supported on said base independently of said housing.

2. A weighing scale as claimed in claim 1 in which said read-out unit is connected to a switch which can be opened and closed momentarily for reading and holding a reading of weight on said read-out unit.

3. A weighing scale as claimed in claim 1 in which said weighing mechanism includes an elongated beam, beam supporting means for pivotally supporting said beam at an intermediate point of said beam, said beam supporting means being mounted on a second supporting means vertically disposed in said housing and extending upwardly from said base independent of said housing, means pivotally mounted centrally of said beam and connected to said platform through said base for exerting a pulling action on said beam in response to a weight placed on said platform, a spring pivotally connected to said beam adjacent one end thereof whereby movement of said beam exerts tension on said spring and vice versa, and a linear variable differential transformer mounted on said base beneath the end of said beam opposite said spring, said transformer containing a core rod pivotally connected to said beam adjacent the end opposite that to which said spring is connected.

4. A weighing scale comprising in combination a base, a weight responsive movable platform mounted on said base, weighing mechanism including a variable inductance transducer which generates a signal in response to weight on said platform, a read-out unit displaying weight measurements and being operable in response to said signal, and an electrical circuit comprising switch means controlling said signal to said read-out unit, said switch means including a plug and a receptacle for said plug, said plug being connected to a remote normally open momentary switch, said circuit normally passing through said receptacle when said plug is removed from said receptacle and passing solely through said momentary switch when said plug is inserted in said receptacle whereby depressing said momentary switch to closed position momentarily will give an instantaneous reading in a read and hold mode.

* * * * *